April 27, 1954  F. MORGAN  2,676,485
METHOD OF SEALING CORES WHILE DETERMINING
THEIR PERMEABILITY
Filed June 15, 1949
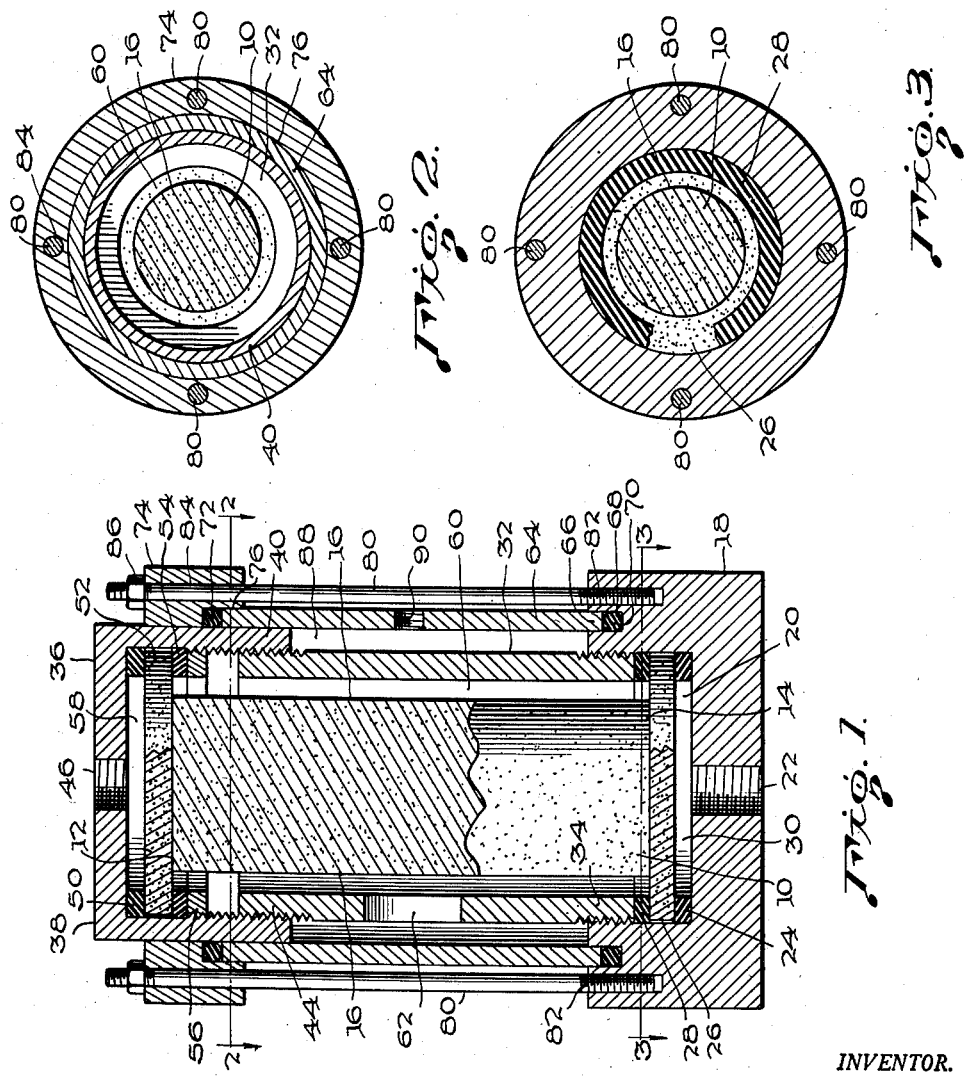
INVENTOR.
FRANK MORGAN
BY A. M. Houghton
HIS ATTORNEY Patented Apr. 27, 1954

2,676,485

UNITED STATES PATENT OFFICE 2,676,485

METHOD OF SEALING CORES WHILE DETERMINING THEIR PERMEABILITY

Frank Morgan, Fox Chapel Borough, Pa., assignor to Gulf Research & Development Company, Pittsburgh, Pa., a corporation of Delaware Application June 15, 1949, Serial No. 99,252

3 Claims. (Cl. 73—38)

This invention relates to a method of determination of permeability of rock cores and other consolidated porous media, and particularly to a method for sealing such cores for testing.

An object of the invention is to provide an improved process for sealing a core for testing the same, whereby by-passing of the flowing fluid therethrough is prevented.

Still another object of the invention is to provide an improved process for determining the permeability of a core, in which the means for sealing outer surfaces of the core against leakage therethrough of test fluid is accomplished by exposing said outer surfaces of the core to a pressurized fluid, gas or liquid, which is non-wetting, to seal the said outer surfaces of the core, so that upon completion of any stage of the test, such sealing fluid may be retracted with no effect upon the test core, so that the test may, if desired, by repeated upon the same core.

A further object of the invention is to provide improved process for testing a core, which is simple in nature, accurate in results, and which is readily and quickly carried out without the use of complex or cumbersome apparatus, yet does not physically or chemically affect the test core itself.

Other objects and advantages of the invention will become apparent from the following description of a preferred embodiment thereof as illustrated in the accompanying drawings, and in which, Figure 1 is a sectional elevation of a core test housing with a core disposed therein ready for test, external connections being omitted from the view, Figure 2 is a sectional plan view taken on plane 2—2 of Figure 1, and Figure 3 is a sectional plan view taken on plane 3—3 of Figure 1.

In determining the permeability of rock cores and other consolidated porous media, the customary procedure has been to measure the quantity of gas or liquid that flows per second per unit of area through a linear sample under a known pressure gradient, and to calculate the permeability by formulae well known in the art.

In making such measurements it is obviously necessary to take precautions to insure that all the test fluid passes through the core. To accomplish this, cores have been usually mounted in an impermeable layer of sealing material which is assumed to adhere tightly to the sides of the sample core without appreciable penetration and thus force all the fluid to flow through the core itself.

Various sealing materials and techniques have been adopted which have, in general, been only partially satisfactory. For example, pitch or tar has been found to be usable with air or water as the core test fluid. However, many hydrocarbons dissolve this sealing material and it must be replaced with some insoluble substance if the permeability of the core to oil is to be determined.

Plastics, such as Lucite and Paraplex, have also recently been employed for sealing the core, but their application has disadvantages, among which are the requirement for expensive molding equipment and specialized mounting techniques. Moreover, both of the above mounting methods are open to the objection that they are time consuming and that each core must be mounted individually. An added disadvantage is that once the core has been coated with the sealing material, it cannot readily be restored to its original state for additional or repeat experiments on the same core.

Rubber has also been employed as a sealing medium, such as in the form of a tapered rubber plug which can be compressed around the core, but, much uncertainty exists concerning the effectiveness of the seal so obtained.

These disadvantages are largely overcome by the present invention, in which the core under test is blanketed with an atmosphere of non-wetting fluid, for example, air, oil, or mercury, under pressure of magnitude consistent with the capillary properties and saturation of the core, to effectively block outflow of test fluid from the core through the surfaces thus blanketed.

In order to understand clearly the nature of the invention, and the best means for carrying it out, reference may now be had to the drawings, in which like numerals denote similar parts throughout the several views.

As shown, there is a consolidated core 10, which is to be tested, for example, to determine its permeability. For the purposes of the illustration, it will be assumed that the permeability will be determined between the entrance and exit end surfaces 12 and 14 of the test core by flowing fluid therebetween, although it will also be understood that the direction of test fluid flow may be reversed therebetween.

To avoid any leakage from the cylindrical surfaces 16 of the test core and consequent by-passing of the test fluid flowing between the surfaces 12 and 14, it will be necessary to seal the surfaces 16 against such leakage therefrom and out of the test core. This will be accomplished in the manner hereinbelow described.

The test core 10 has for convenience been cut in the form of a right circular cylinder. A main base 18 may be formed of metal, with a cylindrical recess 20 emptying into a test fluid discharge opening 22, threaded to receive a suitable discharge pipe or coupling. Inside the recess 20 is disposed a lower sealing ring or gasket 24 formed of suitable sealing material not affected by the test fluid, such as rubber for example if the test fluid is water, or certain forms of synthetic rubber well known in the art to be unaffected by oil, if the test fluid is oil.

A disc 26 forms a capillary diaphragm of the type familiar to those experienced in capillary pressure measurements, and rests upon the resilient sealing ring 24. The test core 10 has its lower surface 14 supported upon the upper surface of the diaphragm 26, being surrounded, though spaced from, the encircling upper resilient sealing ring 28 which also rests upon the upper surface of the diaphragm 26, and is in all respects similar to the lower sealing ring 24. An exit vestibule 30 is thus formed between the lower surface of the diaphragm 26 and the floor of the recess 20.

An inner housing cylinder 32 is threadedly engaged at its lower end portion 34 into the matchingly threaded upper portion of the base recess 20, so that the lower end of the cylinder 32 compresses the gaskets 24 and 26 to form a tight seal. A cup-shaped closure cap 36 comprising a top disc 38 and depending cylindrical skirt 40 has lower internal threads by means of which it is threadedly engaged with the external threads on the upper end portion 44 of the inner housing cylinder 32.

As seen clearly in Figure 1, the top disc 38 has an inlet opening 46 adapted for being coupled to a source of test fluid which is to pass through the test core 10 for determination of the permeability thereof. Against the lower surface of the top disc 38 is an upper resilient gasket 50, annular in shape, and formed of suitable sealing material like the rings 24 and 28. An upper capillary diaphragm 52, which is circular in shape, and similar in all respects to the lower diaphragm 26, is held against the undersurface of the sealing ring 50 by means of a lower sealing ring or gasket 54, which is similar to the upper sealing ring 50. This lower gasket is compressed upwardly by means of an annular pressure member or keeper 56, which, like the ring 54, encircles but is spaced from the test core 10, and is threaded on its perimeter into the threaded interior of the skirt 40. This forms a tight seal, and it will be observed that a fluid entrance vestibule 58 is formed between the upper surface of the diaphragm 52 and the top disc 38, to receive test fluid from inlet opening 46.

Adjustment of the cap 36 upon the cylinder 32 will bring the upper and lower end surfaces 12 and 14 of the test cylinder 10 into good contact with the porous diaphragms 26 and 52. The porous plates 26 and 52, when saturated by the wetting phase, must have an equivalent pressure, that is to say, displacement pressure, greater than the maximum desaturation pressure that is used in a particular experiment. For these plates, porcelain discs of the type manufactured by the Selas Company or the Coors Porcelain Company, in the United States, have been found to be satisfactory for this purpose. The plates of this manufacture are well known in the art, and hence will not be further described in detail.

To insure continuity of the wetting phase and good capillary contact between the core 10 and the porous plates 26 and 52, it may be desirable to place between the upper and lower end surfaces of the core, and the contiguous porous plates or capillary diaphragms, thin tissue paper, blotting paper, or a solid, such as finely divided barium sulphate. Furthermore, the use of springs to secure and maintain capillary contact may be preferred as a method of mounting, in that the alignment of the various parts of the holder and parallelism of the core faces 12 and 14 will be thereby rendered less critical. This purpose may well be helped by use of the resilient gaskets 24, 28, 50 and 54.

Surrounding the test core 10 is an annular space blanket 60 which is confined inside the inner housing cylinder 32. Air or other non-wetting fluid is introduced into this space-blanket chamber 60 through the opening 62 formed in the wall of the cylinder 32.

An outer housing cylinder 64 has its lower end portion 66 extending into a sealing recess 68, annular in shape, and pressing against a sealing resilient ring or gasket 70 disposed therein, so as to form a tight seal. The inside diameter of the cylinder 64 is such as to fit snugly over the skirt 40 of the cap 36, with a sealing top gasket ring 72 pressed downwardly thereupon as seen best in Figure 1, to form a tight seal, by means or an annular pressure ring member 74 which is recessed at 76 to receive the cylinder 64 and the gasket 72.

Tie rods 80 have their lower ends 82 threaded into recesses formed in the main base 18, and extend through bores 84 formed in the pressure ring 74, being compressed upon the latter by means of nuts 86 threaded onto the upper ends of the tie rods, to provide a tight seal of the parts thus brought together, and the firm interengagement thereof in a unitary assembly.

It is seen that an outer sealing-fluid chamber 88, annular in form, is provided between the outer and inner main housing cylinders 64 and 32, and an opening 90 is formed in the wall of the cylinder 64, to permit entrance of sealing fluid from a source, not shown, the sealing fluid thence entering the inner chamber 60 to blanket the wall of the test core 10.

In a preferred method of operation of this invention, the core 10 is first completely saturated with a wetting fluid such as water or brine and then inserted, together with the contacting material, between the two porous membranes 26 and 52, which are likewise saturated with the wetting phase. Pressure sufficient to produce the desired desaturation is then applied to the non-wetting phase, for example, air, in the annular chamber 60.

After capillary equilibrium has been attained, the effective permeability to the wetting phase may be determined by forcing water to flow into one end of the core holder through opening 46, through the capillary diaphragms 52 and 26 and the core 10 in series, and out of the other end outlet 22 of the holder by the application of a suitable pressure gradient. It is necessary, of course, that this gradient be small in order that the saturation along the length of the core 10 will, for practical purposes, remain uniform.

The excess of pressure in the annulus 60 over that in the flowing phase, will determine the liquid saturation of the core 10. For the purpose of this description it will be assumed that the pressure gradient in the wetting phase in the core 10 itself will be determined by methods well known to the art. One such method, that of inserting pressure taps in the core at appropriate locations, is illustrated and described in U. S. Patent No. 2,345,935, to Hassler, dated April 4, 1944.

Alternatively, in cores 10 of high permeability, air in the annulus 60 may be maintained at atmospheric pressure and the liquid phase be subjected in the core to a reduced pressure or a partial vacuum. As before, the pressure gradient inducing flow in the wetting phase must be small in order that any disturbance of equilibrium conditions may be minimized.

It may readily be shown that the pressure difference across a spherical liquid-air interface is given by:

$$P = \frac{2\sigma}{R}$$

where R is the radius of curvature of the bubble and $\sigma$ is the surface tension. This equation likewise gives the air pressure that is required to displace a liquid of surface tension $\sigma$ from a capillary of radius R when the angle of contact between the solid and liquid is zero. The value of the pressure is known as the displacement pressure.

Although in an actual sandstone core the contact angle is usually not zero, and the pores are not of a uniform size, a displacement pressure nevertheless exists which must be exceeded before air will enter a core that is completely saturated with water. If, then, the core 10 as shown in the figure, is subjected to air pressure in chamber 60, slightly less than the displacement pressure, air will not enter the pores and the homogeneous wetting phase permeability may be determined in the manner already described. In this case, the porous diaphragms 52 and 26 are unnecessary and may be dispensed with entirely. Suitable gaskets must then be provided between the core 10 and the end plates. These may be O-rings or gaskets similar to, but of smaller diameter, than those illustrated as seals for the porcelain discs 52 and 26.

Mercury under pressure, for example, a hydrostatic head, may likewise be used in the chamber 60, as a seal for a core in the same manner, in measuring the permeability of the medium to air or other gas. The mercury pressure must, of course, not be less than a suitable value, that is to say, it must exceed the pressure of the air or gas inside the core, but by an amount less than the displacement pressure. These specifications will, in general, require a low pressure gradient in the flowing air or gas stream.

It is understood that the scope of the invention is not limited to linear flow systems through a core, but includes radial and other types of flow and mounting as well.

Although the invention has been described in specific terms, it will be understood that various changes may be made in size, shape, materials and arrangement without departing from the spirit and scope of the invention as claimed.

What is claimed is:

1. The process for sealing a consolidated porous medium for determining the effective homogeneous permeability to a single fluid phase which is forced to flow through the medium, comprising the steps of blanketing the medium with a second fluid phase which is more non-wetting than the flowing phase and subjecting the second fluid phase to a pressure which exceeds the flowing-phase pressure by an amount less than the pressure required for said second fluid phase to displace the flowing phase in the medium.

2. The process for sealing a core sample of a consolidated porous medium for determining its relative permeability to a wetting phase which is forced to flow through the core sample, comprising the steps of applying to the ends of the core sample semi-permeable membranes through which the flowing phase may pass, blanketing the remaining surfaces of the core sample with a liquid non-wetting phase, and subjecting the non-wetting phase to a pressure which exceeds the flowing-phase pressure by the amount required for the non-wetting phase to displace the flowing phase in the core sample to the extent of the pore saturation desired.

3. The process for sealing a core sample of a consolidated porous medium for determining its relative permeability to a wetting phase which is forced to flow through the core sample, comprising the steps of applying to the ends of the core sample semi-permeable membranes through which the flowing phase may pass, blanketing the remaining surfaces of the core sample with a gaseous non-wetting phase, and subjecting the non-wetting phase to a pressure which exceeds the flowing phase pressure by the amount required for the non-wetting phase to displace the flowing phase in the core sample to the extent of the pore saturation desired.

References Cited in the file of this patent

UNITED STATES PATENTS

| Number | Name | Date |
|---|---|---|
| 2,296,852 | Horner | Sept. 29, 1942 |
| 2,345,935 | Hassler | Apr. 4, 1944 |
| 2,465,948 | Welge | Mar. 29, 1949 |
| 2,534,718 | Leas et al. | Dec. 19, 1950 |